United States Patent [19]

Hibler et al.

[11] Patent Number: 4,821,909
[45] Date of Patent: Apr. 18, 1989

[54] HYGIENIC PRESSURE RELIEF PANEL UNIT

[75] Inventors: Donald R. Hibler, Bates City; Eddie R. Malcolm, Independence, both of Mo.

[73] Assignee: Fike Corporation, Blue Springs, Mo.

[21] Appl. No.: 166,266

[22] Filed: Mar. 10, 1988

[51] Int. Cl.$^4$ .............................................. B65D 51/16
[52] U.S. Cl. .................... 220/207; 220/89 A; 52/98; 52/208; 52/232
[58] Field of Search .................... 220/89 A, 207; 137/68.1; 52/232, 207, 208, 204, 97, 98, 99, 309.9

[56] References Cited

U.S. PATENT DOCUMENTS

| | | | |
|---|---|---|---|
| 3,039,482 | 6/1962 | Goldberg | 220/89 A X |
| 4,067,154 | 1/1978 | Fike, Jr. | 52/232 X |
| 4,207,913 | 6/1980 | Fike, Jr. | 137/68.1 |
| 4,498,261 | 2/1985 | Wilson et al. | 220/89 A X |
| 4,512,491 | 4/1985 | De Good et al. | 220/89 A |
| 4,612,739 | 9/1986 | Wilson | 137/68.1 X |
| 4,662,126 | 5/1987 | Malcolm | 220/89 A X |

Primary Examiner—Stephen Marcus
Assistant Examiner—Nova Stucker
Attorney, Agent, or Firm—Hovey, Williams, Timmons & Collins

[57] ABSTRACT

A hygienic pressure relief panel unit is provided which reliably ruptures at a predetermined pressure in order to prevent buildup of dangerous pressure within protected structure such as a vessel or the like defining an enclosed space, which prevents media passage therethrough before rupture, and which presents a sanitary, easily cleanable surface toward the vessel interior in order to inhibit accumulation of food particles, dust, or the like. The preferred panel unit includes a slotted stainless steel panel with the slots configured as a line of weakness for separation at a predetermined pressure, a sheet of PTFE material prepared on one side thereof to present an adhesive bonding surface, and an adhesive coupling the sheet and the panel, whereby the panel unit can be placed in a covering relationship with the vent opening of the protected structured in order to present the outer face of the PTFE sheet toward the vessel interior.

10 Claims, 1 Drawing Sheet

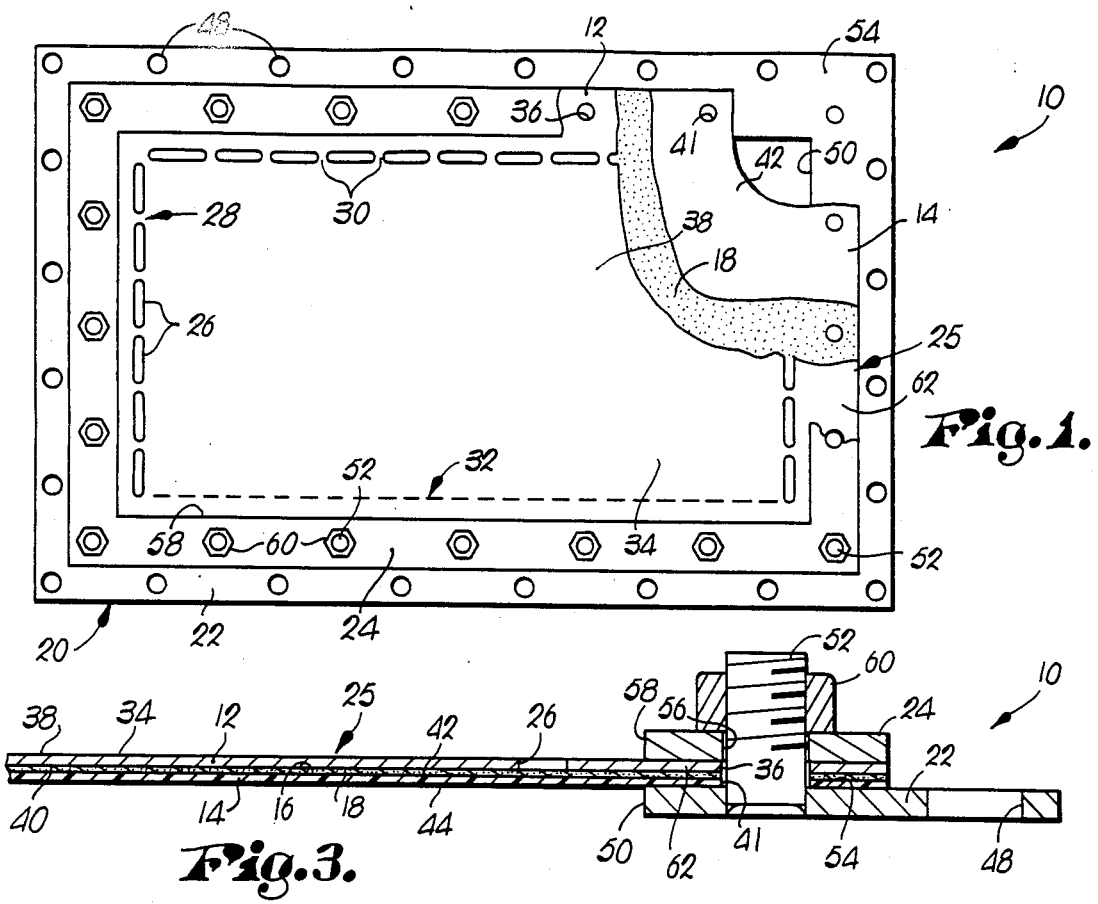
Fig. 1.
Fig. 3.
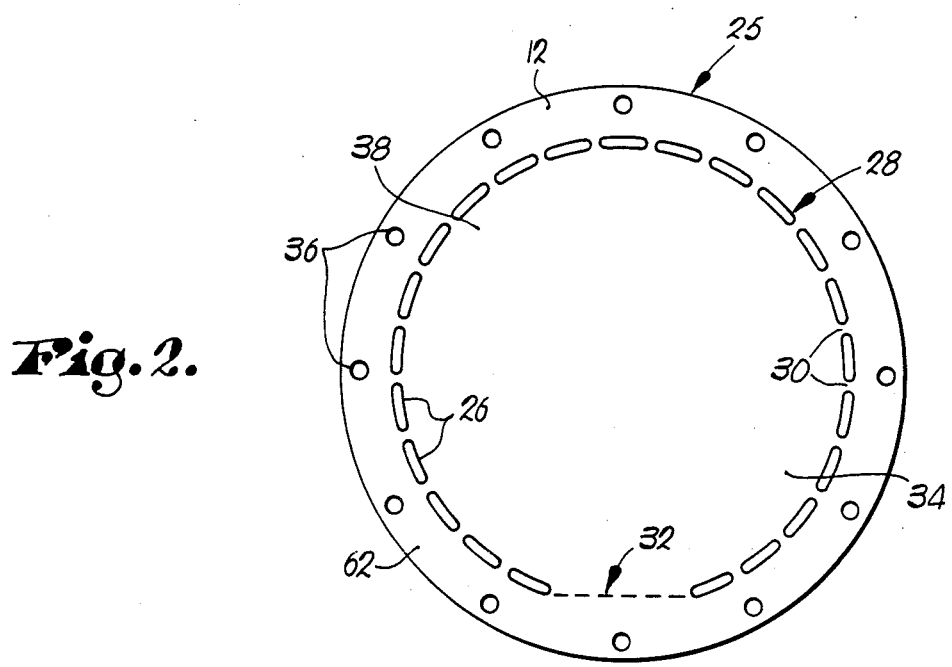
Fig. 2.

HYGIENIC PRESSURE RELIEF PANEL UNIT

BACKGROUND OF THE INVENTION

1. Field of the Invention

The present invention relates to an hygienic, pressure relief, panel unit for use in sanitary applications involving food products or the like. Although the hygienic assembly is especially useful in preventing excessive build up of pressure in food processing equipment such as grinders, dust collectors or similar apparatus, it also has utility in relieving excess pressure in various types of vessels, buildings and enclosed spaces. The pressure relief device is uniquely designed to present a sanitary construction which inhibits the accumulation of food particles and allows thorough cleaning. More particularly, the present invention relates to a pressure relief panel unit including a panel having at least one line of weakness for rupture when the panel is exposed to a predetermined amount of pressure. An imperforate sheet of chemically inert material is disposed over the panel in covering relationship to provide a media tight assembly until rupture and to present a sanitary surface exposed to the interior of the structure.

2. Background of the Prior Art

Pressure relief assemblies, when coupled with the vent of a structure subject to potential pressure buildup, provide assurance that a predetermined amount of pressure will not be exceeded in the interior of the structure. A typical pressure relief assembly includes a metal panel such as stainless steel or other non-rusting metal with lines of weakness defined thereon. These lines of weakness are manufactured to very close tolerances and are designed to separate at a precise predetermined pressure. The lines of weakness may be either score lines or a series of apertures through the panel.

The lines of weakness defined by score lines allow the manufacture of an assembly which is media tight until rupture occurs. Such assemblies, however, are difficult to manufacture for low-pressure applications, as for example under 10 psig. This is attributable to the fact that the thickness of the metal panel is such that when the material is scored to the extent necessary to cause rupture at a low positive pressure, the remaining metal in the scored area must be so thin that it has very little structural strength. Furthermore, it is difficult at best to manufacture a scored panel with predictable low vent pressure characteristics.

In addition, low pressure relief panels as described are usually subjected to varying pressures during use. As a consequence, the constantly varying pressure produces oscillations in the device which causes the effective burst pressure to vary from that initially established rendering the rupture panel unreliable for its intended purpose.

To overcome this problem, typical low-pressure pressure relief assemblies have lines of weakness defined by a series of apertures or slots. The length of the portion of the panel between the slots, commonly called a tab, determines the rupture point of the panel. With this arrangement, the panel itself can be relatively thick for durability and easier machining but yet provide reliable rupture at the desired low pressure.

As those skilled in the art will appreciate, however, the slotted panel must include imperforate material covering the slots to provide an assembly which remains media tight until rupture occurs. The typically preferred sheet material is PTFE or FEP (commonly known as TEFLON). Specifically, this material includes tetrafluoroethylenehexafluoropropylene copolymer (FEP) or polytetrafluoroethylene (TFE or PTFE). PTFE and FEP are preferred because they are relatively chemically inert and because they present a slick "non-stick" surface.

Although a TEFLON sheet has long been used in association with perforated rupture discs to render the unit impervious to flow of media therethrough, a backup device also containing apertures has been required to cause the sheet to remain in conforming relationship to the rupture disc. Without such backup structure presenting in effect a sandwich arrangement, the TEFLON sheet is subject to pressure exertions which weaken the material to a point that it fails prior to the predetermined rupture pressure being exceeded.

In the case of food products, it is not desirable to utilize an internal perforated panel to hold a TEFLON sheet against a rupture disc or panel because the perforations in the retainer panel serve as cavities for entrapment and accumulation of food particles in the apertures of the interior backup panel or plate. These particles can even work their way between the interior panel and the TEFLON sheet thus preventing effective cleaning. This has an adverse effect on the hygienics of the food processing or conveying equipment. It thus is essential that the internal face of the rupture device be sufficiently smooth and cavity free as to substantially avoid entrapment or retention of food particles for any significant period of time.

It has not heretofore been feasible to adhesively affix a TEFLON sheet to a rupture panel or disc because the smooth non-stick surface of the TEFLON prevents reliable bonding of the adhesive thereto. Accordingly, the prior art points out the need for a pressure relief panel unit which presents a sanitary design suitable for food environments.

SUMMARY OF THE INVENTION

The needs in the prior art as outlined above are satisfied by the hygienic pressure relief panel unit of the present invention. That is to say, the preferred panel unit hereof presents a sanitary design suitable for use in food environments.

Broadly speaking, the preferred panel unit includes a panel having at least one line of weakness for separation therealong in the event the panel is exposed to a predetermined amount of pressure, an imperforate sheet of material selected from the group including PTFE and FEP covering the panel, bonding means defined on the inner face of the sheet for presenting a bonding surface for allowing adhesive coupling to another surface, and adhesive means adhesively coupling the sheet with the panel, whereby the panel unit may be placed in a covering relationship with the vent opening of a structure to be protected with the outer face of the sheet toward the structure interior. The preferred panel unit thereby presents a sanitary surface toward the structure interior and prevents media passage through the assembly until separation along the line of weakness when the assembly is exposed to a predetermined amount of pressure.

In preferred forms, the bonding surface of the sheet is prepared by exposing the surface to an electric discharge in a gaseous atmosphere containing inert carrier gas and between 15 and 30% by volume acetone. Desirably, the panel is composed of stainless steel or other non-rusting alloy.

In use, the sheet of preferred PTFE or FEP material presents a non-stick relatively chemically inert finish toward the interior of the structure to be protected thereby avoiding any slots or crevices in which food particles can accumulate and thereby presenting a surface resistant to chemical deterioration which can be easily and thoroughly cleaned. In the event a predetermined amount of pressure occurs as defined by the line of weakness, the line of weakness separates, the sheet of material ruptures, and the pressure in the structure is relieved.

BRIEF DESCRIPTION OF THE DRAWING FIGURES

FIG. 1 is a front elevational view with portions cutaway of one preferred embodiment of the panel unit as part of a typical assembly;

FIG. 2 is a front elevational view of a second preferred embodiment of the panel unit; and FIG. 3 is a typical partial sectional view of the preferred assembly.

DETAILED DESCRIPTION OF THE PREFERRED EMBODIMENTS

Referring to the first preferred embodiment illustrated in FIG. 1 and the typical section in FIG. 3, hygienic pressure relief assembly 10 includes panel 12, sheet 14, adhesive bonding surface 16 defined on sheet 14, adhesive 18 disposed between panel 12 and sheet 14, and vent coupling means 20 including base flange 22 and hold down flange 24. Panel 12, sheet 14, surface 16, and adhesive 18 together makeup the preferred panel unit 25.

Panel 12 is rectangularly shaped in the first embodiment and preferably composed of 304 stainless steel or 316 stainless steel as desired for the particular application. Other suitable metals include titanium, nickel, inconel, and aluminum. In a typical application for a burst pressure of 1.0 psig, panel 12 is about 18 inches high by about 35 inches wide by about 0.018 inches thick. Panel thicknesses up to 0.060 inches are typical.

Panel 12 also includes a series of slotted apertures 26 defined therethrough configured to present a line of weakness 28 defining three sides of a rectangle. Line of weakness 28 defines the predetermined amount of pressure at which panel 12 ruptures. In the example above, apertures 26 are about 2.5 inches long and spaced apart by tabs 30 at about 0.100 inches. Line of weakness 28 is designed to separate upon exposure to 1.0 psig in this example.

Panel 12 also includes bend line 32 and rupture portion 34 outlined by line of weakness 28 and bend line 32. Rupture portion 34 bends, that is, rotates about bend line 32 when panel 12 ruptures.

Bend line 32 is naturally defined when panel 12 ruptures but can be further defined by perforating to ensure that portion 34 bends along line 32. Perforating of bend line 32 is desirable as the overall dimensions of panel 12 decrease, as the intended rupture pressure decreases, and when the volume of media in the protected structure is low. In the example above which ruptures at 1.0 psig, bend line 32 is preferably perforated. Perforations are generally unnecessary for burst pressures of 10 psig and above.

Panel 12 also includes a plurality of panel mounting holes 36 disposed adjacent the periphery thereof for mounting panel 12 to base flange 22 as will be explained.

Additionally, panel 12 presents forward side 38 and rearward side 40.

Sheet 14 is preferably composed of TEFLON or the like (PTFE or FEP) and is preferably up to 0.010 inches thick (0.002 inches thick in the example above). TEFLON or an equivalent material is particularly preferred because it is relatively chemically inert and therefore resistant to corrosion and the effects of cleaning solutions. Additionally, TEFLON presents a non-stick finish which inhibits the adherence of food particles thereto and which allows rapid, easy, and very thorough cleaning, particularly important in a food environment. Additionally, TEFLON has a low enough tensile strength so that it readily separates along lines generally coincident with line of weakness 28 when panel 12 ruptures.

Sheet 14 preferably covers rearward side 40 including apertures 26 to prevent passage of media such as ambient air, fluid and particulates through panel unit 25 until it ruptures. Additionally, sheet 14 includes a plurality of mounting holes 41 in registration with mounting holes 36 of panel 12 and presents inner face 42 and outer face 44.

Adhesive bonding surface 16 is defined on the surface of inner face 42 and presents a roughened or "etched" surface sufficient to allow an adhesive to adhere thereto in order to adhesively couple sheet 14 with panel 12. Without bonding surface 16, the non-stick surface of inner face 42 prevents effective and thus reliable adhesive coupling which has heretofore been a problem in the prior art.

Preferred sheet 14 is commercially available with adhesive bonding surface 16 defined thereon in thicknesses up to 0.005 inches from DuPont of Wilmington, De. under the designation FEP-C500. In the DuPont process, adhesive bonding surface 16 is defined on inner face 42 by exposing sheet 14 to electric discharge in a gaseous atmosphere containing a substantially inert carrier gas and between 15 and 30% by volume acetone as described in U.S. Pat. No. 3,676,181 and other patents referenced therein. Sheet 14 is also commercially available in thicknesses up to 0.010 inches from The Porter Chemical Process Company of Hatfield, Pa. which uses a proprietary chemical etching technique in order to define bonding surface 16.

As commercially supplied, both faces of sheet 14 are etched and both present an adhesive bonding surface which allows either side to be used as inner face 42. Even though outer face 44 may also be etched as described above, it still retains sufficient non-stick properties to present a surface resistant to accumulation of food particles thereon and to allow thorough cleaning.

Adhesive 18 is preferably a conventional silicone rubber adhesive such as that available from General Electric Company as types RTV108 or RTV118. Adhesive 18 is disposed between inner face 42 of sheet 14 and rearward side 40 of panel 12. Preferably adhesive 18 substantially covers the entire bonding surface 16 of inner face 42 for ensuring secure adhesive coupling between sheet 14 and panel 12.

Base flange 22 and hold down flange 24 are the preferred means of coupling assembly 10 with the structure to be protected, that is, for placing panel unit 25 in a covering relationship with the vent opening of the protected structure. Rectangular, metal, base flange 22 includes a plurality of bolt holes 48 defined along the periphery thereof for registration with corresponding bolt holes defined in a conventional vent flange (not shown) of the protected structure for receiving respective conventional mounting bolts (not shown) for coupling base flange 22 with the vent flange. Base flange 22 also includes central opening 50 configured so that base flange 22 surrounds panel rupture portion 34 just outside the boundaries defined by line of weakness 28 and bend line 32.

A plurality of mounting studs 52 extend outwardly from forward surface 54 of flange 22 as shown in FIG. 1. Studs 52 are configured to extend through sheet mounting holes 41 and panel mounting holes 36 for positioning and holding panel 12 and sheet 14 adhered thereto to base flange 22.

Rectangular hold down flange 24 includes a plurality of hold down mounting holes 56 configured to register with mounting holes 36 and to receive respective mounting studs 52 therethrough. Hold down flange 24 also presents a central aperture 58 the same size as and in registration with central opening 50. Advantageously, hold down flange 24 can be constructed of angle-iron shaped components with the outwardly extending legs thereof (not shown) surrounding central aperture 58 to add structural strength to hold down flange 24.

Conventional nuts 60 are threadably received on studs 52 and snugly secure hold down flange 24 to base flange 22 with respective peripheral portions of panel 12 and sheet 14 therebetween as shown in FIG. 3. Desirably, a conventional gasket (not shown) of preferably rubber or TEFLON is used between base flange 22 and sheet 14 or between hold down flange 24 and panel 12 or both.

FIG. 2 illustrates a second preferred embodiment of panel unit 25 and corresponding elements are numbered the same. Panel unit 25 of FIG. 2 is configured for coupling with a round vent flange rather than a rectangularly-shaped vent flange. With this configuration, line of weakness 28 presents an arcuate configuration rather than the three-sided rectangularly-shaped configuration as shown in FIG. 1.

Panel unit 25 is particularly useful for protecting structures in a food environment. For example, panel unit 25 can be used to protect a dust collector which collects food particle dust from a dry food process. These types of dust collectors filter the dust through collection "socks" which are periodically pulsed with air to dislodge collected food particles therefrom for discharge from the dust collector. Food particle dust, such as flour, is known to be explosive in the correct mixture with air and accordingly pressure relief protection is desirable to limit damage to the dust collection vessel and other components of the dust collection system.

Panel unit 25, when coupled with the vent flange of a food dust collector or other structure, presents inner face 42 of sheet 14 toward the interior of the vessel. With this arrangement, only inner face 42 is exposed to the vessel interior and no cracks, crevices, slot openings or the like are presented where food particles might accumulate and thereby prevent thorough cleaning. Additionally, sheet 14, when composed of preferred TEFLON, is resistant to deterioration or corrosive effects when exposed to strong cleaning solutions used to clean the interior of the dust collection vessel. The smooth, non-stick finish presented by outer face 44 inhibits accumulation of food particles thereon and allows rapid, thorough cleaning of any particles which might accumulate.

Bonding surface 16 allows secure, permanent, adhesive coupling, heretofore not possible, between panel 12 and sheet 14 which effectively resists separation when the assembly is exposed to pressure pulses.

The configuration of line of weakness 28 precisely defines a predetermined amount of pressure which will be allowed to build up within the protected structure. If such pressure accumulates, panel 12 separates along line of weakness (that is, tabs 30 break between apertures 26) and panel rupture portion 34 bends along bend line 32. During this separation, sheet 14 also tears generally along a line coincident with line of weakness 28 because of its much lower tensile strength. When these events occur, the protected structure interior is exposed through its vent opening and through panel unit 25 to ambient to relieve the pressure. Until such an occurrence, sheet 14 prevents any media passage through panel unit 25.

Those skilled in the art will appreciate that the present invention encompasses many variations in the preferred embodiments described herein. For example, lines of weakness can be configured in a variety of patterns such as a star pattern or the like as a matter of design choice for the particular application. Additionally, in some applications it may be desirable to define lines of weakness by scoring rather than by apertures through the panel. Furthermore, while non-rusting metal is preferred for panel 12, other materials such as synthetic resin material might be suitable. The panel unit hereof is also useful in environments other than the food environment herein preferred. For example, panel unit 25 may be used in a highly corrosive environment so that only sheet 14 is exposed to the interior of a structure to avoid corrosion of other portions of the assembly.

Having thus described the preferred embodiments of the present invention, the following is claimed as new and desired to be secured by Letters Patent:

1. A hygienic pressure relief panel unit for use with a pressure relief assembly for protecting a structure such as a vessel, building, or the like defining an enclosed interior from buildup of a predetermined amount of pressure within the structure interior, the structure presenting a vent opening communicating the structure interior with the structure exterior, the assembly including means for placing said panel unit in a covering relationship with the vent opening, said panel unit comprising:

a panel having means defining at least one line of weakness for separation therealong in the event said panel is exposed to a predetermined amount of pressure, said panel presenting a forward side and a rearward side;

an imperforate sheet of material selected from the group including PTFE and FEP, said sheet presenting an inner face and an outer face, said sheet rupturing in the event of exposure to a predetermined amount of pressure;

means defined on said inner face for presenting a bonding surface for allowing adhesive bonding therewith; and adhesive means adhering said bonding surface with said rearward side thereby coupling said sheet with said panel, said inner face substantially covering said apertures, whereby said panel unit, when placed in a covering relationship with the vent opening, being adapted for presenting said outer face of said sheet toward the structure interior, and preventing media passage therethrough until buildup of a predetermined amount of pressure within the structure interior whereupon said at least one line of weakness separates and said sheet ruptures to relieve the pressure.

2. The panel unit as set forth in claim 1, said adhesive means including a silicone rubber adhesive.

3. The panel unit as set forth in claim 1, said bonding surface being prepared by electric discharge in a gaseous atmosphere containing substantially inert carrier gas and between 15 and 30% by volume acetone.

4. The panel unit as set forth in claim 1, said bonding surface being prepared by chemical etching.

5. The panel unit as set forth in claim 1, said panel unit including a peripheral portion, said means for placing said panel unit in a covering relationship including a hold down flange, a base flange, and means for coupling the hold down flange to the base flange with said peripheral portion therebetween.

6. The panel unit as set forth in claim 1, said line of weakness presenting an arcuate configuration.

7. The panel unit as set forth in claim 1, said line of weakness defining three sides of a rectangle.

8. The panel unit as set forth in claim 1, said panel being composed of stainless steel.

9. The panel unit as set forth in claim 1, said line of weakness being defined by spaced-apart, elongated, adjacent slots.

10. The panel unit as set forth in claim 1, said line of weakness being defined by scoring said panel.

* * * * *